Jan. 2, 1934.   R. F. KEHRBERG   1,941,864
COOLING AND VENTILATING DEVICE
Filed April 4, 1932   2 Sheets-Sheet 1
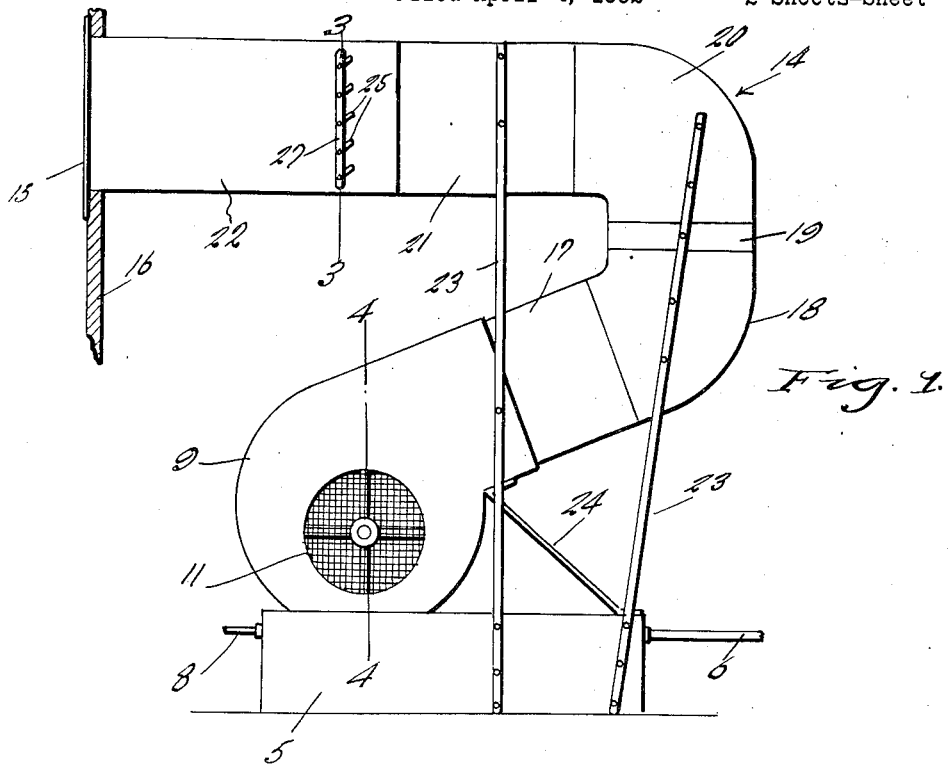
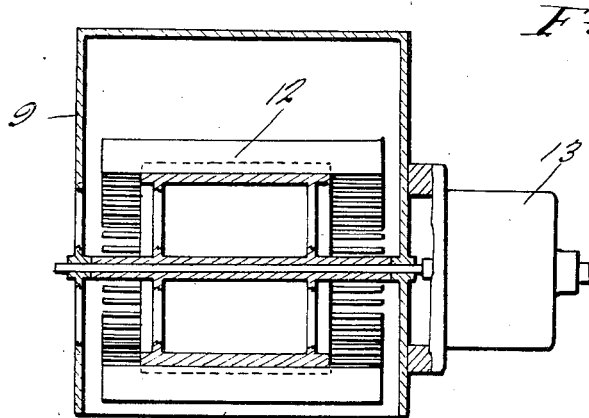
Inventor
Richard F. Kehrberg
By Clarence A. O'Brien
Attorney Jan. 2, 1934.   R. F. KEHRBERG   1,941,864
COOLING AND VENTILATING DEVICE
Filed April 4, 1932    2 Sheets-Sheet 2
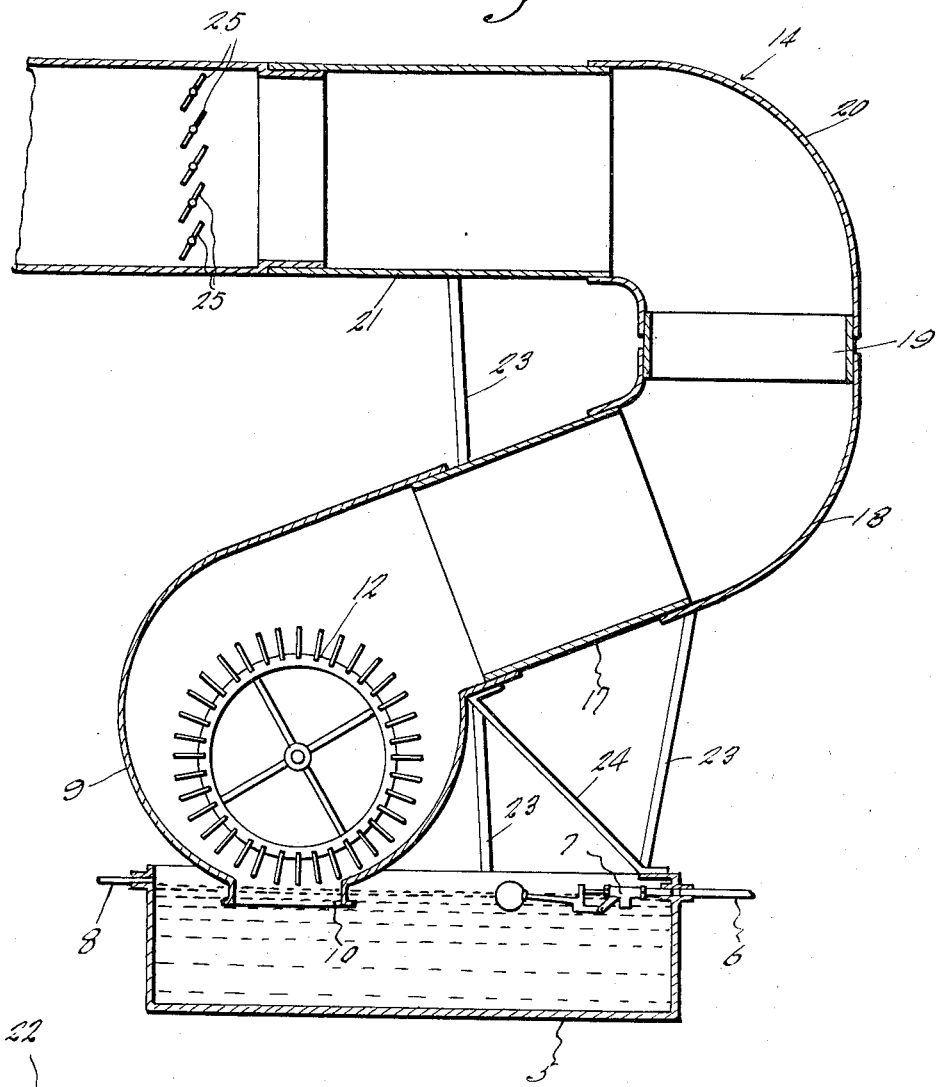
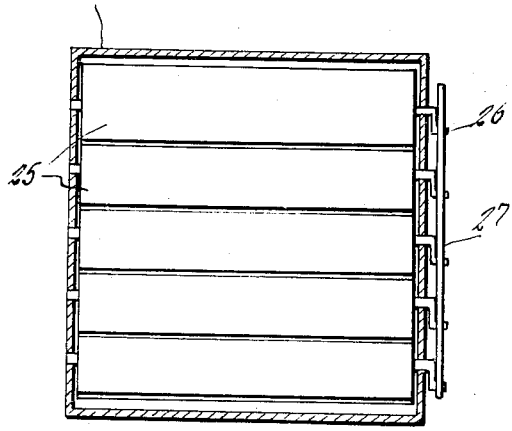
Inventor
Richard F. Kehrberg
By Clarence A. O'Brien
Attorney Patented Jan. 2, 1934

1,941,864

UNITED STATES PATENT OFFICE 1,941,864

COOLING AND VENTILATING DEVICE

Richard F. Kehrberg, Sheldon, Iowa

Application April 4, 1932. Serial No. 603,076

1 Claim. (Cl. 261—92)

This invention relates to cooling and ventilating devices and in accordance with the present invention means is provided for simultaneously drawing air and water into a blower to be subsequently delivered to the room or space to be ventilated or cooled.

Further, in accordance with the present invention a single blower operates both for mixing the air and water and subsequently forcing the water laden and cleansed air from the casing for use.

The invention together with its numerous objects and advantages will be best understood from a study of the following description, taken in connection with the accompanying drawings wherein:

Figure 1 is a side elevational view of the device.

Figure 2 is a sectional elevational view therethrough, and

Figures 3 and 4 are sectional views taken substantially on the lines 3—3 and 4—4 respectively of Figure 1.

Referring more in detail to the drawings it will be seen that 5 designates a water pan or tank to which water is fed from a suitable source of supply through the medium of a feed pipe 6 and the liquid level in the tank 5 is automatically controlled through the medium of a suitable float operated valve 7 and an overflow pipe 8.

A blower casing of suitable shape and construction is designated by the reference character 9 and the same at the bottom thereof is provided with an inlet neck 10 extending into the tank 5 and normally below the liquid level of the tank. One side of the wall of the casing 5 is provided with an air inlet opening over which is set a sheet of wire or other reticulated material 11. Suitably mounted within the casing 9 is a blower fan 12 driven from a suitable electric motor 13 that is suitably mounted at that side of the casing 9 remote from the lateral air intake opening above referred to.

Leading from the outlet side of the blower casing 9 is a substantially U-shaped air duct designated generally by the reference character 14, and as shown in Figure 1 the duct 14 is connected with a suitable ventilator grating 15 suitably provided in a wall 16.

The duct 14 is formed through the medium of a coupling sleeve 17 connecting the outlet neck of the casing 9 with an elbow 18; a coupling sleeve 19 connecting the elbow 18 with the elbow 20; while a coupling sleeve 21 connects the free end of the elbow 20 with one end of a tube 22 provided at the end of the conduit 14 and suitably connected with the ventilator 15.

The casing 9 and the tube and coupling sleeve forming the conduit 14 are suitably supported and braced with respect to the tank 5 through the medium of braces 23, 24.

Discharge of the water laden air from the conduit 14 is controlled through the medium of a series of baffle plates 25 pivotally mounted, in the present instance in the conduit tube 22 as suggested in Figure 2 with the pivots of the baffle plates arranged in vertically spaced relation and provided at one end with crank arms 26 connected by a rod 27 located exteriorly of the conduit 14 and easily operated to adjust the baffle plates.

In operation it will be seen that water in the tank 5 will be maintained at a suitable level, and water from the tank will be drawn into the blower 9 during rotation of the fan 12 as will also air which will pass into the casing through the reticulated or air stream inlet and the water laden air will be forced by the blower to the conduit 14 and wall ventilator grating 15 to the room or space to be ventilated.

In providing the baffle plates 25 means is afforded, as is apparent, for reducing the humidity of the air passing into the conduit 14 subsequent to the passage of air through the ventilator grating. This reduction of humidity is also further accomplished by reason of providing through the medium of the elbows 18, 20 the return bend in the conduit 14.

Even though I have herein shown and described the preferred embodiment of the invention, it is to be understood that I do not wish to limit myself to the precise details of construction, combination and arrangement of elements as herein shown, but claim all such forms of the invention to which I am entitled in view of the requirements of the prior art and the scope of the appended claim.

Having thus described my invention, what I wish to claim as new is:

In a device of the character described, the combination with a ventilator wall grating, a water tank remote from said ventilator, brackets rising from the walls of the tank, a blower including a casing supported by said brackets, said casing having a lateral air inlet, and also having at its bottom a depending neck extending into the water in the tank below the level thereof, supply and overflow means respectively connected with the tank, a float control valve connected with the supply means for the tank, a blower fan mounted in the blower casing, a motor mounted exteriorly of said casing and having driving connection with said fan, said blower casing being also provided with an outlet neck, and a substantially U-shaped conduit connecting said ventilator grating with the outlet neck of the blower casing, and a plurality of baffles mounted on vertically spaced pivots within said conduit inwardly from that end of the conduit connected with said ventilator grating, and means exteriorly of the conduit connecting the pivots of said baffles for simultaneously operating them.

RICHARD F. KEHRBERG.